(12) United States Patent
Reddy et al.

(10) Patent No.: US 10,077,397 B2
(45) Date of Patent: *Sep. 18, 2018

(54) WELLBORE SERVICING MATERIALS AND METHODS OF MAKING AND USING SAME

(71) Applicant: Halliburton Energy Services, Inc., Houston, TX (US)

(72) Inventors: B. Raghava Reddy, The Woodlands, TX (US); Larry S. Eoff, Duncan, OK (US); Christopher A. Lewis, Houston, TX (US); Natalie L. Pascarella, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/215,266

(22) Filed: Jul. 20, 2016

(65) Prior Publication Data

US 2016/0326425 A1 Nov. 10, 2016

Related U.S. Application Data

(63) Continuation of application No. 13/893,868, filed on May 14, 2013.

(51) Int. Cl.
*C09K 8/72* (2006.01)
*C09K 8/68* (2006.01)
(Continued)

(52) U.S. Cl.
CPC ........... *C09K 8/68* (2013.01); *C09K 8/035* (2013.01); *C09K 8/5083* (2013.01); *C09K 8/5086* (2013.01); *C09K 8/514* (2013.01); *C09K 8/5753* (2013.01); *C09K 8/588* (2013.01); *C09K 8/602* (2013.01); *C09K 8/725* (2013.01); *C09K 8/882* (2013.01); *E21B 43/04* (2013.01);
(Continued)

(58) Field of Classification Search
CPC ........................................................ C09K 8/035
See application file for complete search history.

(56) References Cited

U.S. PATENT DOCUMENTS 5,855,244 A * 1/1999 Ahmed ................ C07C 237/04
166/270
6,476,169 B1 11/2002 Eoff et al.
(Continued)

OTHER PUBLICATIONS

International Search Report and Written Opinion issued in related Application No. PCT/US2014/036931, dated Sep. 25, 2014 (16 pages).

(Continued)

*Primary Examiner* — William D Hutton, Jr.
*Assistant Examiner* — Avi T Skaist
(74) *Attorney, Agent, or Firm* — Craig Roddy; Baker Botts L.L.P.

(57) ABSTRACT

A method of servicing a wellbore in a subterranean formation comprising placing a wellbore servicing fluid in the wellbore and/or subterranean formation, wherein the wellbore servicing fluid comprises a hydrophobically modified relative permeability modifier, an oxygenated alkylating agent, and an aqueous base fluid, and allowing the wellbore servicing fluid to modify the permeability of at least a portion of the wellbore and/or subterranean formation.

13 Claims, 3 Drawing Sheets

(51) Int. Cl.
*E21B 43/25* (2006.01)
*C09K 8/035* (2006.01)
*C09K 8/508* (2006.01)
*C09K 8/514* (2006.01)
*C09K 8/588* (2006.01)
*C09K 8/60* (2006.01)
*C09K 8/88* (2006.01)
*C09K 8/575* (2006.01)
*E21B 43/04* (2006.01)
*E21B 43/26* (2006.01)
*E21B 43/267* (2006.01)

(52) U.S. Cl.
CPC .............. *E21B 43/25* (2013.01); *E21B 43/26* (2013.01); *E21B 43/267* (2013.01)

(56) References Cited

U.S. PATENT DOCUMENTS

| | | | |
|---|---|---|---|
| 6,920,928 | B1 | 7/2005 | Davies et al. |
| 7,091,159 | B2 | 8/2006 | Eoff et al. |
| 7,114,568 | B2 | 10/2006 | Eoff et al. |
| 7,117,942 | B2 | 10/2006 | Dalrymple et al. |
| 7,159,656 | B2 | 1/2007 | Eoff et al. |
| 7,182,136 | B2 | 2/2007 | Dalrymple et al. |
| 7,216,707 | B2 | 5/2007 | Eoff et al. |
| 7,220,708 | B2 | 5/2007 | Zamora et al. |
| 7,493,957 | B2 | 2/2009 | Nguyen et al. |
| 7,552,771 | B2 | 6/2009 | Eoff et al. |
| 7,563,750 | B2 | 7/2009 | Eoff et al. |
| 7,589,048 | B2 | 9/2009 | Eoff et al. |
| 7,595,283 | B2 | 9/2009 | Eoff et al. |
| 7,741,251 | B2 | 6/2010 | Eoff et al. |
| 7,759,292 | B2 | 7/2010 | Eoff et al. |
| 7,934,557 | B2 | 5/2011 | Nguyen |
| 7,998,910 | B2 | 8/2011 | Todd et al. |
| 8,183,186 | B2 | 5/2012 | Luo et al. |
| 8,196,655 | B2 | 6/2012 | Kalman et al. |
| 8,387,694 | B2 | 3/2013 | Dalrymple et al. |
| 8,420,576 | B2 | 4/2013 | Eoff et al. |
| 8,470,746 | B2 | 6/2013 | Eoff |
| 2005/0164894 | A1* | 7/2005 | Eoff ............... C09K 8/5083 507/200 |
| 2006/0240994 | A1* | 10/2006 | Eoff ............... C09K 8/035 507/214 |
| 2007/0281869 | A1* | 12/2007 | Drochon ......... C09K 8/602 507/219 |
| 2008/0196897 | A1 | 8/2008 | Nguyen |
| 2009/0120642 | A1 | 5/2009 | Eoff et al. |
| 2010/0184630 | A1 | 7/2010 | Sullivan et al. |
| 2012/0264885 | A1 | 10/2012 | Eoff et al. |

OTHER PUBLICATIONS

Invitation to Pay Additional Fees issued in related Application No. PCT/US2014/036931, dated Jun. 26, 2014 (5 pages).

International Preliminary Report on Patentability issued in related Application No. PCT/US2014/036931, dated Jul. 23, 2015 (21 pages).

* cited by examiner

WELLBORE SERVICING MATERIALS AND METHODS OF MAKING AND USING SAME

CROSS-REFERENCE TO RELATED APPLICATIONS

This application is a continuation of U.S. application Ser. No. 13/893,868, filed on May 14, 2013.

STATEMENT REGARDING FEDERALLY SPONSORED RESEARCH OR DEVELOPMENT

Not applicable.

BACKGROUND

This disclosure relates to methods of servicing a wellbore. More specifically, it relates to servicing a wellbore with a relative permeability modifier.

Natural resources (e.g., oil or gas) residing in the subterranean formation may be recovered by driving resources from the formation into a wellbore using, for example, a pressure gradient that exists between the formation and the wellbore, the force of gravity, displacement of the resources from the formation using a pump or the force of another fluid injected into the well or an adjacent well. The production of fluid in the formation may be increased by hydraulically fracturing the formation. That is, a treatment fluid (e.g., a fracturing fluid) may be pumped down the wellbore at a rate and a pressure sufficient to form fractures that extend into the formation, providing additional pathways through which the oil or gas can flow to the well.

Subsequently, oil or gas residing in the subterranean formation may be recovered by driving the fluid into the well using, for example, a pressure gradient that exists between the formation and the wellbore, the force of gravity, displacement of the fluid using a pump or the force of another fluid injected into the well or an adjacent well. The production of the fluid in the formation may be increased by hydraulically fracturing the formation. That is, a fracturing fluid may be pumped down the casing to the formation at a rate and a pressure sufficient to form fractures that extend into the formation, providing additional pathways through which the oil or gas can flow to the well. Unfortunately, water along with oil or gas may eventually be produced by the formation through the fractures therein. In such cases, the formation may be treated with a relative permeability modifier (RPM) that is meant to control water production, shut off water-producing intervals, and/or enhance hydrocarbon production. A particularly effective RPM material for such applications includes water-soluble polymers that are hydrophobically modified with suitable hydrocarbon groups.

A challenge to the use of hydrophobically modified RPMs (HMRPMs) is that some of HMRPMs lose their effectiveness to control or shutoff water production under certain conditions including, for example, the temperature at a downhole pH and salinity exceeding the lower critical solution temperature (LCST) of the polymer. For example, at temperatures greater than about 140° F. and at a pH of greater than about 7, some HMRPMs may precipitate out of solution limiting their effectiveness as relative permeability modifiers. Precipitation of the RPM not only substantially terminates its relative permeability-modifying properties, but also can damage a subterranean formation if the precipitation occurs downhole. Thus, an ongoing need exists for improved compositions and methods for utilizing RPMs in subterranean formations.

SUMMARY

Disclosed herein is a method of servicing a wellbore in a subterranean formation comprising placing a wellbore servicing fluid in the wellbore and/or subterranean formation, wherein the wellbore servicing fluid comprises a hydrophobically modified relative permeability modifier, an oxygenated alkylating agent, and an aqueous base fluid, and allowing the wellbore servicing fluid to modify the permeability of at least a portion of the wellbore and/or subterranean formation.

Also disclosed herein is a method of servicing a wellbore in a subterranean formation comprising placing a wellbore servicing fluid in the wellbore and/or subterranean formation, wherein the wellbore servicing fluid comprises a hydrophobically modified relative permeability modifier, an oxygenated alkylating agent, and an aqueous base fluid; wherein the hydrophobically modified relative permeability modifier comprises poly(alkyldimethylammoniumethyl methacrylate), the oxygenated alkylating agent comprises chlorine end-capped methylpolyethylene glycol, and the aqueous base fluid comprises a brine, and allowing the wellbore servicing fluid to modify the permeability of at least a portion of the wellbore and/or subterranean formation.

Further disclosed herein is a method of servicing a wellbore in a subterranean formation comprising placing a wellbore servicing fluid in the wellbore and/or subterranean formation, wherein the wellbore servicing fluid comprises a pre-reacted hydrophobically modified relative permeability modifier/oxygenated alkylating agent, and an aqueous base fluid, and allowing the wellbore servicing fluid to modify the permeability of at least a portion of the wellbore and/or subterranean formation.

Further disclosed herein is an aqueous based wellbore servicing fluid with a pH of equal to or greater than about 2 comprising a hydrophobically modified relative permeability modifier, wherein the hydrophobically modified relative permeability modifier comprises a water-soluble, hydrophobically modified polymer and an oxygenated alkylating agent, wherein the oxygenated alkylating agent comprises a compound characterized by the general formula R—X, where X is a leaving group and R comprises at least one oxygen atom for every from about 1 to about 5 carbons, with a carbon-to-oxygen ratio of from about 5:1 to about 1:1.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

Figure 1:
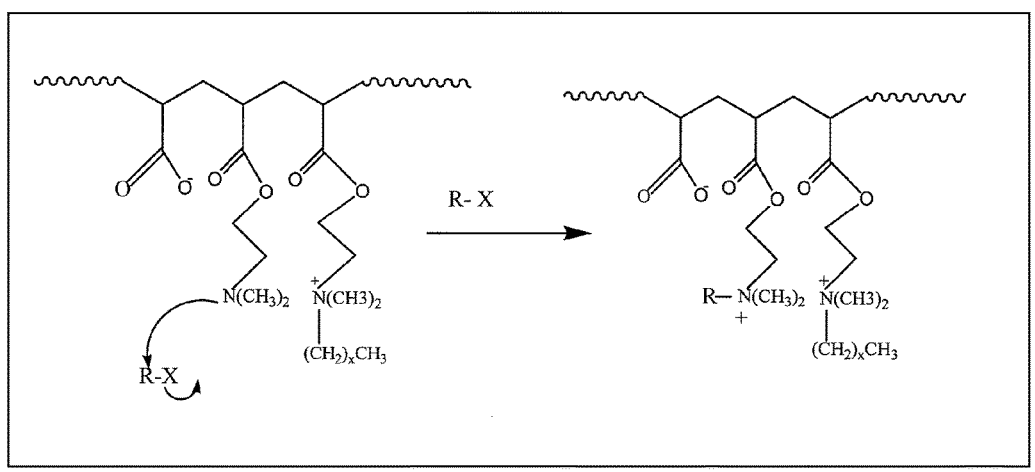
FIG. 1 displays a schematic for the alkylation of an amine group of a relative permeability modifier.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques below, including the exemplary designs and implementations illustrated and described herein, but may be modified within the scope of the appended claims along with their full scope of equivalents.

Disclosed herein are wellbore servicing fluids or compositions (collectively referred to herein as WSFs) and methods of using same. In an embodiment, the wellbore servicing fluid may comprise a hydrophobically modified relative permeability modifier (HMRPM) and an oxygenated alkylating agent (OAA), collectively referred to herein as HMRPM/OAA or a HMRPM/OAA combination, and a sufficient amount of an aqueous base fluid to form a pumpable WSF. Utilization of a WSF comprising a HMRPM/OAA in the methods disclosed herein may advantageously facilitate modifying the relative permeability of at least a portion of a wellbore and/or subterranean formation. In an embodiment, the WSF comprises a HMRPM polymer (e.g., hydrophobically modified polymer; water-soluble, hydrophobically modified polymer) that has been pre-reacted (e.g., prior to being added to a WSF) with an OAA under conditions to form the HMRPM/OAA combination, which may then be added to the WSF in desired amounts. For purposes of the disclosure herein the HMRPM/OAA prepared by pre-reacting a HMRPM with an OAA (e.g., prior to contact with one or more additional WSF components) will be referred to as "pre-reacted HMRPM/OAA." In an embodiment, pre-reacting a HMRPM with an OAA comprises contacting the HMRPM with the OAA. In an embodiment, the HMRPM/OAA comprises a pre-reacted HMRPM/OAA.

In an embodiment, the HMRPM/OAA of the type disclosed herein may be characterized by a lower critical solution temperature (LCST) equal to or greater than about 140° F., alternatively equal to or greater than about 180° F., or alternatively equal to or greater than about 300° F. Without wishing to be limited by theory, the LCST of a polymer (e.g., a HMRPM polymer; a hydrophobically modified polymer; a water-soluble, hydrophobically modified polymer, etc.) may be defined as the temperature above which the polymer phase separates, and forms an insoluble solid phase, such as for example a precipitate or a turbid suspension. For a particular WSF composition, once the temperature of the WSF reaches the LCST or a value above the LCST of the HMRPM polymer (e.g., hydrophobically modified polymer; water-soluble, hydrophobically modified polymer), the HMRPM polymer may precipitate out the solution, which is undesirable, as it may damage the formation and/or lose its effectiveness as a relative permeability modifier. The presence of the HMRPM/OAA combination in the WSF raises the LCST of the HMRPM polymer when compared to a WSF of similar composition comprising a HMRPM, but no OAA. For example, if the LCST of a WSF comprising a HMRPM and no OAA is y, the LCST of a similar WSF comprising both a HMRPM and an OAA may be about (y+50) ° F., alternatively about (y+150)° F., or alternatively about (y+250)° F.

In an embodiment, the presence of the OAA in the WSF along with the HMRPM may function to increase the solubility of the HMRPM in the WSF at temperatures above the LCST of HMRPM. Without wishing to be limited by theory, the presence of at least one oxygen atom in the structure of the OAA renders the OAA and consequently the HMRPM/OAA more hydrophilic (e.g., water-soluble), when compared with a similar alkylating agent that does not comprise any oxygen atoms, but is rather a hydrocarbon based alkylating agent. Further, in the case of an HMRPM comprising a pendant dialkylamino group, such as for example a pendant dimethylamino group as seen in FIG. 1, when the OAA quaternizes an amine group of the HMRPM (e.g., a pendant dialkylamino group such as for example a pendant dimethylamino group as seen in FIG. 1), such quaternized amine group has a positive charge on the nitrogen atom, which charge may render the HMRPM more water-soluble at temperatures above the LCST of the untreated HMRPM polymer (e.g., a HMRPM in the absence of an OAA).

In an embodiment, the presence of the OAA in the WSF along with the HMRPM may function to delay the precipitation of the HMRPM indefinitely at the formation temperatures. In an embodiment, the presence of the OAA in the WSF along with the HMRPM may function to delay the precipitation of the HMRPM by a time period of from equal to or greater than about 1 hour to equal to or greater than about 100 hours, alternatively equal to or greater than about 3 hours, alternatively equal to or greater than about 24 hours, alternatively equal to or greater than about 2 days, at the formation temperatures, when compared to a WSF of similar composition comprising a HMRPM, but no OAA. The extent of the delay may be adjusted by one of ordinary skill in the art with the benefit of this disclosure to meet the needs of the process by adjusting the nature of the OAA used (e.g., OAA type, OAA solubility, amounts, etc.).

In an embodiment, the WSF comprises a pre-reacted HMRPM/OAA that has an LCST equal to or greater than about 150° F., alternatively equal to or greater than about 250° F., or alternatively equal to or greater than about 350° F.

In an embodiment, the WSF comprises a hydrophobically modified relative permeability modifier (HMRPM). HMRPMs herein refer to materials used to reduce a subterranean formation's effective permeability to water while minimally impacting the subterranean formation's effective permeability to oil and/or gas. In an embodiment, the HMRPM comprises a water-soluble, hydrophobically modified polymer. Herein the disclosure may refer to a polymer and/or a polymeric material. It is to be understood that the terms polymer and/or polymeric material herein are used interchangeably and are meant to each refer to compositions comprising at least one polymerized monomer in the presence or absence of other additives traditionally included in such materials. The term "derivative" is defined herein to include any compound that is made from one or more of the HMRPMs, for example, by replacing one atom in the HMRPM with another atom or group of atoms, rearranging two or more atoms in the HMRPM, ionizing one of the HMRPMs, or creating a salt of one of the HMRPMs. The term "copolymer" as used herein is not limited to the combination of two monomers, but includes any combination of monomers, e.g., terpolymers, quadpolymers, and the like. The copolymers may be linear copolymers, branched copolymers, graft copolymers, block copolymers, dendritic copolymers, and the like. HMRPMs are described in more detail in U.S. Pat. Nos. 6,476,169; 7,114,568; 7,182,136; 7,493,957; 7,595,283; 7,759,292; 7,998,910; 8,387,694; 8,420,576; U.S. Publication Nos. 2011/0034351 A1 and 2012/0135895 A1; each of which is incorporated by reference herein in its entirety.

In an embodiment, the HMRPM comprises a water-soluble, hydrophobically modified polymer (e.g., a water-soluble polymer with hydrophobic modification) containing one or more substituents capable of reacting with an alkylating agent. Nonlimiting examples of substituents which are capable of reacting with an alkylating agent include amino groups, including primary, secondary and tertiary amine groups; hydroxyls; thiols; thioethers; carboxylates and activated methylene carbons adjacent to one or more carbonyl groups. As used herein, "water-soluble" refers to equal to or greater than about 0.0001 wt. %, alternatively equal to or greater than about 0.001 wt. %, alternatively equal to or greater than about 0.01 wt. %, alternatively equal to or greater than about 0.1 wt. %, or alternatively equal to or greater than about 1 wt. % solubility in distilled water at room temperature. A water-soluble polymer with hydrophobic modification is referred to herein as a "water-soluble, hydrophobically modified polymer." As used herein, the term "hydrophobic modification," or "hydrophobically modified," refers to the incorporation into a hydrophilic polymer structure of hydrophobic groups. As used herein, the term "hydrophobic modification," or "hydrophobically modified," refers to the incorporation into the hydrophilic polymer structure of hydrophobic groups comprising alkyl chain groups with a length of from about 6 to about 22 carbons, alternatively from about 10 to about 22 carbons, or alternatively from about 12 to about 18 carbons. While these hydrophobically modified polymers have hydrophobic groups incorporated into the hydrophilic polymer structure, those suitable for use in the present disclosure are water-soluble.

In an embodiment, the HMRPM comprises a polyelectrolyte. Without wishing to be limited by theory, polyelectrolytes are polymers that contain ionic groups. In an embodiment, the ionic groups of the polyelectrolyte may be cationic groups, anionic groups, zwitterionic groups, or any combination thereof. In some embodiments, the polyelectrolyte contains only cationic groups. In other embodiments, the polyelectrolyte contains only anionic groups. In some other embodiments, the polyelectrolyte contains only zwitterionic groups. In an embodiment, the number of cationic groups exceeds the number of anionic groups in the polyelectrolyte. In another embodiment, the number of anionic groups exceeds the number of cationic groups in the polyelectrolyte. In yet another embodiment, the polyelectrolyte is electrically neutral due to the number of cationic groups being equal to the number of anionic groups, as would be the case when the charged groups are exclusively zwitterionic. In still yet another embodiment, the polyelectrolyte is non-ionic.

The water-soluble, hydrophobically modified polymers may be synthesized using any suitable method. In an embodiment, the water-soluble, hydrophobically modified polymers may be a reaction product of a hydrophilic polymer and a hydrophobic compound, i.e., hydrophobic modification. Those of ordinary skill in the art, with the benefit of this disclosure, will be able to determine other suitable methods for the preparation of suitable water-soluble, hydrophobically modified polymers.

In an embodiment, the HMRPM may be included within the WSF in a suitable amount. In an embodiment, a HMRPM of the type disclosed herein may be present within the WSF in an amount of from about 0.01 wt. % to about 10 wt. %, alternatively from about 0.1 wt. % to about 3 wt. %, or alternatively from about 0.5 wt. % to about 1 wt. %, based on the total weight of the WSF.

In an embodiment, the hydrophilic polymers suitable for use in this disclosure (e.g., suitable for a hydrophobic modification process) comprise acrylamide based polymers, hydrolyzed polyacrylamides, polyvinylamines, poly(vinylamines/vinyl alcohols), alkyl acrylate polymers, alkylamino acrylate polymers, alkylamino alkylacrylate polymers, polydimethylaminoethyl methacrylate, polydimethylaminopropyl methacrylamide, poly(acrylamide/dimethylaminoethyl methacrylate), poly(methacrylic acid/dimethylaminoethyl methacrylate), poly(2-acrylamido-2-methyl propane sulfonic acid/dimethylaminoethyl methacrylate), poly(acrylamide/dimethylaminopropyl methacrylamide), poly(acrylic acid/dimethylaminopropyl methacrylamide), and poly(methacrylic acid/dimethylaminopropyl methacrylamide), or combinations thereof.

In some embodiments, the hydrophilic polymer may comprise a polymer backbone that contains a reactive amino group in the polymer backbone or as a pendant group, wherein the reactive amino group is capable of reacting with a hydrophobic compound and/or an oxygenated alkylating agent. In other embodiments, the hydrophilic polymer comprises a dialkyl amino pendant group. In other embodiments, the hydrophilic polymer may comprise a pendant group that comprises a dimethyl amino group, e.g., polymers comprising dimethylaminoethyl methacrylate or dimethylaminopropyl methacrylamide monomers. In some embodiments, a suitable hydrophilic polymer may be formed from monomers containing amine groups in an amount ranging from about 20 mole % to about 100 mole % of the monomers, alternatively from about 40 mole % to about 80 mole % of the monomers, or alternatively from about 50 mole % to about 75 mole % of the monomers.

In certain embodiments, a suitable hydrophilic polymer may comprise a polymer backbone comprising polar heteroatoms, such as for example oxygen, nitrogen, sulfur, phosphorous, or combinations thereof. Nonlimiting examples of hydrophilic polymers comprising polar heteroatoms within the polymer backbone suitable for use in the present disclosure include celluloses, chitosans, polyamides, polyetheramines, polyethyleneimines, polyhydroxyetheramines, polylysines, polysulfones, gums, starches, derivatives thereof, or combinations thereof.

In an embodiment, hydrophobic compounds suitable for reacting with the hydrophilic polymers comprise alcohols; amines; epoxides; alkyl halides; alkyl sulfonates; alkyl sulfates; organic acids, such as for example octenyl succinic acid and dodecenyl succinic acid; organic acid derivatives, such as for example anhydrides thereof, esters thereof, imides thereof, amides thereof, acid halides thereof; or combinations thereof. In some embodiments, the hydrophobic compounds comprise alkyl groups with a chain length ranging from about 6 to about 22 carbon atoms, alternatively from about 10 to about 22 carbons, or alternatively from about 12 to about 18 carbons.

When the hydrophobic compound is an alkyl halide, for example, the reaction between the hydrophobic compound and the hydrophilic polymer comprising amino groups may result in the quaternization of at least some of the hydrophilic polymer amino groups, wherein the alkyl chain length is from about 6 to about 22 carbons, alternatively from about 10 to about 22 carbons, or alternatively from about 12 to about 18 carbons.

In an embodiment, the water-soluble, hydrophobically modified polymer comprises a hydrophilic monomer and a hydrophobic compound of the type described previously herein in a mole ratio ranging from about 99.98:0.02 to about 90:10 (hydrophilic monomer to hydrophobic compound), alternatively from about 80 to about 20, or alternatively from about 70 to about 30, wherein the hydrophilic monomer is a calculated amount present in the hydrophilic polymer.

Nonlimiting examples of hydrophilic monomers suitable for use in the present disclosure include acrylamide, 2-acrylamido-2-methyl propane sulfonic acid, N,N-dimethylacrylamide, vinyl pyrrolidone, dimethylaminoethyl methacrylate, dimethylaminoethyl methacrylamide, acrylic acid, dimethylaminopropyl methacrylamide, vinyl amine, vinyl acetate, trimethylammoniumethyl methacrylate chloride, methacrylamide, hydroxyethyl acrylate, hydroxymethylacrylate, hydroxyethylmethacrylate, polyethylene glycol acrylate, polyethylene glycol methacrylate, polypropylene gylcol acrylate, polypropylene glycol methacrylate, alkyl amino methacrylate, N-hydroxymethylacrylamide, N-hydroxymethylmethacrylamide, vinyl sulfonic acid, vinyl phosphonic acid, methacrylic acid, vinyl caprolactam, N-vinylformamide, itaconic acid, styrene sulfonic acid, quaternary salt derivatives of acrylamide, quaternary salt derivatives of acrylic acid, methacrylamidoethyltrimethyl ammonium halide, N,N-diallylacetamide, dimethyldiallyl ammonium halide, or combinations thereof. For purposes of this disclosure herein, a halide may comprise chloride, bromide, iodide, or a halide equivalent, such as for example toluenesulfonate (i.e., tosylate) or methanesulfonate (i.e., mesylate), or combinations thereof.

In an embodiment, the water-soluble, hydrophobically modified polymer may be prepared from a polymerization reaction comprising a hydrophilic monomer and/or a hydrophobically modified hydrophilic monomer. Methods for preparing water-soluble, hydrophobically modified polymers are described in more detail in U.S. Pat. No. 6,476,169, which is incorporated by reference herein in its entirety. Those of ordinary skill in the art, with the benefit of this disclosure, will be able to determine other suitable methods for the synthesis of suitable water-soluble, hydrophobically modified polymers. The hydrophobically modified hydrophilic monomer may be a reaction product of a hydrophilic monomer and a hydrophobic compound of the type previously described herein. In an embodiment, the hydrophobically modified hydrophilic monomers comprise alkyl acrylates, alkyl methacrylates, alkyl acrylamides, alkyl methacrylamides, alkyl dimethylammoniumethyl methacrylate halides, alkyl dimethylammoniumethyl methacrylamide halides, alkyl dimethylammoniumpropyl methacrylate halides, alkyl dimethylammoniumpropyl methacrylamide halides, or combinations thereof. In such embodiment, the alkyl groups comprise from about 6 to about 22 carbon atoms, alternatively from about 10 to about 22 carbons, or alternatively from about 12 to about 18 carbons. In an embodiment, the hydrophobically modified hydrophilic monomer comprises octadecyldimethylammoniumethyl methacrylate bromide, hexadecyldimethylammoniumethyl methacrylate bromide, octadecyldimethylammoniumethyl methacrylamide bromide, hexadecyldimethylammoniumpropyl methacrylamide bromide, 2-ethylhexyl methacrylate, octadecyl methacrylamide, hexadecyl methacrylamide, or combinations thereof.

In an embodiment, the water-soluble, hydrophobically modified polymers comprise hydrophobically modified poly(dimethylaminoethyl methacrylate), hydrophobically modified poly(dimethylaminopropyl methacrylamide), poly(alkyldimethylammoniumethyl methacrylate), poly(octadecyldimethylammoniumethyl methacrylate), poly(hexadecyldimethylammoniumethyl methacrylate), poly(octadecyldimethylammoniumethyl methacrylamide), poly(hexadecyldimethylammoniumpropyl methacrylamide), acrylamide/octadecyldimethylammoniumethyl methacrylate bromide copolymer, dimethylaminoethyl methacrylate/vinyl pyrrolidone/hexadecyldimethylammoniumethyl methacrylate bromide terpolymer, acrylamide/2-acrylamido-2-methyl propane sulfonic acid/2-ethylhexyl methacrylate terpolymer, amino methacrylate/alkyl amino methacrylate copolymer, dimethylaminoethyl methacrylate/alkyl-dimethylammoniumethyl methacrylate copolymer, dimethylaminoethyl methacrylate/hexadecyldimethylammoniumethyl methacrylate copolymer, dimethylaminoethyl methacrylate/hexadecyldimethylammoniumethyl methacrylate bromide copolymer, dimethylammoniumethyl methacrylate/cetyldimethylammoniumethyl methacrylate copolymer, dimethylaminoethyl acrylate/acrylate/alkyldimethylammoniumethyl acrylate copolymer, or combinations thereof. A representation of the structure of a dimethylaminoethyl acrylate/acrylate/alkyldimethylammoniumethyl acrylate copolymer is shown by Structure I:

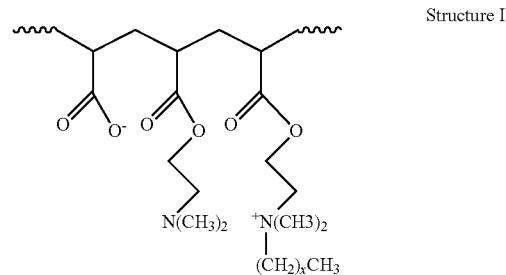

Structure I wherein the atoms in parentheses represent a repeating unit of the formula where the repeating units may occur x times with the value of x ranging from about 6 to about 22, alternatively from about 10 to about 22, or alternatively from about 12 to about 18. The wavy lines in Structure I represent the remainder of the HMRPM polymer molecule. An example of a commercially available water-soluble, hydrophobically modified polymer suitable for use in the present disclosure includes without limitation HPT-1 relative permeability modifier. HPT-1 relative permeability modifier is a hydrophobically modified hydrophilic polymer containing alkyldimethylammoniumethyl methacrylate halide units, and is available from Halliburton Energy Services, Inc.

HMRPM polymers suitable for use in the present disclosure may have molecular weights in the range of from about 10,000 Da to 10,000,000 Daltons, alternatively from about 100,000 Da to about 10,000,000 Da, alternatively from about 10,000 Da to about 1,000,000 Da, or alternatively from about 1,000 Da to about 500,000 Da.

In an embodiment, the HMRPMs may be further characterized by their precipitate forming tendency in aqueous solutions. Generally, as the pH of a solution increases, e.g., pH values greater than about 7, the HMRPMs tend to precipitate out of the solution at decreasing temperatures, due to a decreased solubility in the aqueous media. For purposes of the disclosure herein, the precipitate forming tendency is an empirical qualitative metric which may be rated on a letter scale from A to F, wherein A indicates no precipitate forming tendency for the HMRPM; F indicates full precipitate forming tendency (e.g., all or most of the HMRPM precipitates out the solution) for the HMRPM; and B, C, D and E indicate increased precipitate forming tendency when compared to the previous letter (e.g., the precipitate forming tendency designated by B is higher than the precipitate forming tendency designated by A, but lower than the precipitate forming tendency designated by C; the precipitate forming tendency designated by C is higher than the precipitate forming tendency designated by B, but lower than the precipitate forming tendency designated by D; the precipitate forming tendency designated by D is higher than the precipitate forming tendency designated by C, but lower than the precipitate forming tendency designated by E; and the precipitate forming tendency designated by E is higher than the precipitate forming tendency designated by D, but lower than the precipitate forming tendency designated by F). The letter scale rating of the precipitate forming tendency and the associated visual descriptions (e.g., definitions) of any formed precipitate are provided in Table 1.

TABLE 1

| Rating | Definition/Visual Description |
|---|---|
| A | clear, no precipitation |
| B | slightly cloudy (transparent) |
| C | cloudy (opaque) |
| D | cloudy (opaque), small (less than about 1 mm) clumps precipitated |
| E | cloudy (opaque), medium (about 1 mm) clumps precipitated |
| F | cloudy (opaque), large (equal to or greater than about 1 mm) clumps precipitated |

The precipitate forming tendency of a HMRPM may be visually assessed as follows: a clear solution has a precipitate forming tendency of A; a slightly cloudy solution has a precipitate forming tendency of B; a cloudy solution has a precipitate forming tendency of B-C; a cloudy solution with small clumps of precipitated solid (e.g., precipitated HMRPM) has a precipitate forming tendency of D; a cloudy solution with medium size clumps of precipitated solid (e.g., precipitated HMRPM) has a precipitate forming tendency of E; and a solution with large clumps of precipitated solid (e.g., precipitated HMRPM) has a precipitate forming tendency of F, as detailed in Table 1. In an embodiment, the HMRPMs suitable for use in the present disclosure comprise a precipitate forming tendency of about A, alternatively in the range of from about A to about C, or alternatively from about A to about B.

In an embodiment, the WSF comprises an oxygenated alkylating agent (OAA) characterized by the general formula R—X, where X is a leaving group and R comprises at least one oxygen atom for every from about 1 to about 5 carbons, with a carbon-to-oxygen ratio of from about 5:1 to about 1:1; alternatively at least one oxygen atom for every from about 2 to about 4 carbons, with a carbon-to-oxygen ratio of from about 4:1 to about 2:1; or alternatively at least one oxygen atom for every from about 2 to about 3 carbons, with a carbon-to-oxygen ratio of from about 3:1 to about 2:1.

The OAA may react with any suitable reactive group present in the HMRPM polymer backbone and/or present as a pendant group in the HMRPM. The OAA may react with any primary, secondary or tertiary amine groups; hydroxyls; thiols; thioethers; carboxylates and/or activated methylene carbons adjacent to one or more carbonyl groups present in the HMRPM.

In an embodiment, X comprises any leaving group suitable for use in an alkylation reaction of a reactive group. Nonlimiting examples of X leaving groups suitable for use in this disclosure include halide, chloride, bromide, iodide, sulfonate, sufonate esters, toluenesulfonate (i.e., tosylate), methanesulfonate (i.e., mesylate), carboxylate group, or combinations thereof.

In an embodiment, the OAA comprises alcohols; polyethylene oxides; polyethylene glycols, chlorine end-capped methylpolyethylene glycol (MPEG-Cl); polypropylene glycols; amines; epoxides; oxygenated alkyl halides; oxygenated alkyl sulfonates; oxygenated alkyl sulfates; halogenated organic acids, chloroacetic acid; chloroacetate esters, methyl chloroacetate; chloroacetate salts, sodium chloroacetate; carboxylic acid anhydrides, chloroacetic anhydride; esters; imides; amides; acid halides; derivatives thereof; or combinations thereof. An example of a polyethylene glycol based OAA suitable for use in the present disclosure includes without limitation D-4253M, which is a chlorine end-capped methylpolyethylene glycol that was obtained from NALCO.

In an embodiment, the OAA excludes all alkylating agents that do not comprise at least one oxygen atom. In an embodiment, the OAA comprises an alkylating agent that does not comprise at least one oxygen atom in an amount of less than about 20 wt. %, 19 wt. %, 18 wt. %, 17 wt. %, 16 wt. %, 15 wt. %, 14 wt. %, 13 wt. %, 12 wt. %, 11 wt. %, 10 wt. %, 9 wt. %, 8 wt. %, 7 wt. %, 6 wt. %, 5 wt. %, 4 wt. %, 3 wt. %, 2 wt. %, or 1 wt. %, based on the total weight of the OAA. Nonlimiting examples of alkylating agents that do not comprise at least one oxygen atom include alkyl halides wherein the alkyl portion of the halide is solely hydrocarbon based and comprises no polar atoms (e.g., oxygen); 2-chloro-ethyltrimethylammonium halide; 2-bromo-ethyltrimethylammonium halide, 3-chloro-bromopropyl trimethylammonium halide; 3-bromopropyl trimethylammonium halide; derivatives thereof; and combinations thereof.

In an embodiment, the OAA may react with a functional group (e.g., an amine group) of the HMRPM, resulting in an OAA modification (e.g., quaternization of the nitrogen) of such functional group. For example, the OAA may react with an amine group of the HMRPM, resulting in the quaternization of the nitrogen of such amine group. Without wishing to be limited by theory, the amine group of the HMRPM and the alkylating agent (e.g., OAA) may engage in a nucleophilic substitution reaction, where the amine group of the HMRPM acts as the nucleophilic agent that attacks the alkylating agent, causing the leaving group to "leave" the alkylating agent. Further, without wishing to be limited by theory, the quaternization of amine groups of the HMRPM may lead to an increased solubility of the HMRPM in aqueous media. In some embodiments, the OAA may quaternize from about 1% to about 50% of the amine groups of the HMRPM, alternatively from about 1% to about 25% of the amine groups, or alternatively from about 5% to about 20% of the amine groups.

In some embodiments, the mole ratio of OAA modifications (e.g., OAA quaternization sites) to hydrophobic modifications present in the water-soluble, hydrophobically modified polymer HMRPMs may be in the range of from about 1:1 to about 500:1, alternatively from about 10:1 to about 300:1, or alternatively from about 50:1 to about 250:1.

In an embodiment, an OAA may be added directly into a WSF containing HMRPM in an amount sufficient to modify the precipitate forming tendency of the HMRPM. In such embodiment, the OAA modified HMRPM (e.g., HMRPM/OAA) comprises a precipitate forming tendency of less than about C, alternatively less than about B, or alternatively less than about A, at the treatment temperature, when the HMRPM is contacted with an OAA. In an embodiment an OAA of the type disclosed herein may be present within the WSF in an amount of from about 0.001 wt. % to about 1 wt. %, alternatively from about 0.01 wt. % to about 0.5 wt. %, or alternatively from about 0.05 wt. % to about 0.1 wt. %, based on the total weight of the WSF.

In an embodiment, the WSF comprises an aqueous base fluid. Herein, an aqueous base fluid refers to a fluid having equal to or less than about 20 vol. %, 15 vol. %, 10 vol. %, 5 vol. %, 2 vol. %, or 1 vol. % of a non-aqueous fluid based on the total volume of the WSF. In an embodiment, the aqueous base fluid has a pH of equal to or greater than about 2, alternatively equal to or greater than about 5, or alternatively equal to or greater than about 8. Aqueous base fluids that may be used in the WSF include any aqueous fluid suitable for use in subterranean applications, provided that the aqueous base fluid is compatible with the HMRPM and/or OAA used in the WSF. For example, the WSF may comprise water or a brine. In an embodiment, the base fluid comprises an aqueous brine. In such an embodiment, the aqueous brine generally comprises water and an inorganic monovalent salt, an inorganic multivalent salt, or both. The aqueous brine may be naturally occurring or artificially-created. Water present in the brine may be from any suitable source, examples of which include, but are not limited to, sea water, tap water, freshwater, water that is potable or non-potable, untreated water, partially treated water, treated water, produced water, city water, well-water, surface water, or combinations thereof. The salt or salts in the water may be present in an amount ranging from greater than about 0% by weight to a saturated salt solution, alternatively from about 1 wt. % to about 18 wt. %, or alternatively from about 2 wt. % to about 7 wt. %, by weight of the aqueous fluid. In an embodiment, the salt or salts in the water may be present within the base fluid in an amount sufficient to yield a saturated brine.

Nonlimiting examples of aqueous brines suitable for use in the present disclosure include chloride-based, bromide-based, phosphate-based or formate-based brines containing monovalent and/or polyvalent cations, salts of alkali and alkaline earth metals, or combinations thereof. Additional examples of suitable brines include, but are not limited to: NaCl, KCl, NaBr, $CaCl_2$, $CaBr_2$, $ZnBr_2$, ammonium chloride ($NH_4Cl$), potassium phosphate, sodium formate, potassium formate, cesium formate, ethyl formate, methyl formate, methyl chloro formate, triethyl orthoformate, trimethyl orthoformate, or combinations thereof. In an embodiment, the aqueous fluid comprises a brine. The brine may be present in an amount of from about 40 wt. % to about 99.8 wt. %, alternatively from about 70 wt. % to about 99.5 wt. %, or alternatively from about 90 wt. % to about 99 wt. %, based on the total weight of the WSF. Alternatively, the aqueous base fluid may comprise the balance of the WSF after considering the amount of the other components used.

The WSF may further comprise additional additives as deemed appropriate for improving the properties of the fluid. Such additives may vary depending on the intended use of the fluid in the wellbore. Examples of such additives include, but are not limited to pH adjusting agents, bases, acids, pH buffers, surfactants, emulsifiers, conventional relative permeability modifiers, lime, organic/inorganic viscosifiers, gelling agents, crosslinkers, weighting agents, glass fibers, carbon fibers, suspending agents, clays, clay control agents, fluid loss control additives, dispersants, flocculants, conditioning agents, dispersants, water softeners, acids, foaming agents, proppants, salts, mutual solvents, oxidation and corrosion inhibitors, scale inhibitors, thinners, scavengers, gas scavengers, lubricants, breakers, friction reducers, antifoam agents, bridging agents, and the like, or combinations thereof. These additives may be introduced singularly or in combination using any suitable methodology and in amounts effective to produce the desired improvements in fluid properties.

In an embodiment, the WSF comprises a pH adjusting agent. In some embodiments, the pH adjusting agent is a base. In other embodiments, the pH adjusting agent is an acid. In some other embodiments, the pH adjusting agent is a pH buffer.

In an embodiment, a base may be used for increasing the pH of a solution by about 0.1 pH units, alternatively, about 0.2 pH units, alternatively, about 0.5 pH units, alternatively, about 1.0 pH units, alternatively, about 1.5 pH units, alternatively, about 2.0 pH units, alternatively, about 2.5 pH units, alternatively, about 3.0 pH units, alternatively, about 4.0 pH units, alternatively, about 5.0 pH units, alternatively, about 6.0 pH units, or alternatively, about 7.0 or more pH units.

Nonlimiting examples of bases suitable for use in the present disclosure include ammonium and alkali metal carbonates and bicarbonates, $Na_2CO_3$, $K_2CO_3$, $CaCO_3$, $MgCO_3$, $NaHCO_3$, $KHCO_3$, alkali and alkaline earth metal oxides, BaO, SrO, $Li_2O$, CaO, $Na_2O$, $K_2O$, MgO, alkali and alkaline earth metal hydroxides, NaOH, $NH_4OH$, KOH, LiOH, $Mg(OH)_2$, alkali and alkaline earth metal phosphates, $Na_3PO_4$, $Ca_3(PO_4)_2$, and the like, or combinations thereof. In an embodiment, the base may be included within the WSF in a suitable amount that will provide the desired pH.

In an embodiment, an acid may be used for decreasing the pH of a solution by about 0.1 pH units, alternatively, about 0.2 pH units, alternatively, about 0.5 pH units, alternatively, about 1.0 pH units, alternatively, about 1.5 pH units, alternatively, about 2.0 pH units, alternatively, about 2.5 pH units, alternatively, about 3.0 pH units, alternatively, about 4.0 pH units, alternatively, about 5.0 pH units, alternatively, about 6.0 pH units, or alternatively, about 7.0 or more pH units.

Nonlimiting examples of acids suitable for use in the present disclosure include mineral acids, hydrochloric acid, sulphuric acid, sulphonic acid, sulphamic acid; organic acids, formic acid, acetic acid, monochloroacetic acid, dichloroacetic acid, trichloroacetic acid, sulphinic acid, methanesulfonic acid, lactic acid, glycolic acid, oxalic acid, propionic acid, butyric acid; ammonium salts, and salts of weak bases, such as for example organic amines; or combinations thereof. In an embodiment, the acid may be included within the WSF in a suitable amount that will provide the desired pH.

In an embodiment, the pH adjusting agent is a pH buffer. The pH buffer comprises a combination of weak acids or weak bases, in combination with the corresponding salts to maintain the pH of a fluid in a desired range. Nonlimiting examples of chemical combinations which can be used as pH buffers include acetic acid/sodium acetate; sodium carbonate/sodium bicarbonate; and sodium dihydrogen phosphate/sodium monohydrogen phosphate.

In an embodiment, a WSF comprises a HMRPM comprising a polymer characterized by Structure I, an OAA comprising chloroacetic anhydride, and an aqueous base fluid comprising a KCl brine. The presence of the chloroacetic anhydride OAA may lead to a precipitate forming tendency of the HMRPM polymer characterized by Structure I of from about A to about B.

In another embodiment, a WSF comprises a HMRPM comprising dimethylammoniumethyl methacrylate/cetyldimethylammoniumethyl methacrylate copolymer, an OAA comprising chlorine end-capped polyethylene glycol product D-4253M, and an aqueous base fluid comprising a KCl brine. The presence of the D-4253M OAA may lead to a precipitate forming tendency of the dimethylammoniumethyl methacrylate/cetyldimethylammoniumethyl methacrylate copolymer of from about A to about B.

In yet another embodiment, a WSF comprises a HMRPM comprising HPT-1 relative permeability modifier, an OAA comprising sodium chloroacetate, and an aqueous base fluid comprising a KCl brine. The presence of the sodium chloroacetate OAA may lead to a precipitate forming tendency of the HPT-1 relative permeability modifier of from about A to about B.

In still yet another embodiment, a WSF comprises a HMRPM comprising HPT-1 relative permeability modifier, an OAA comprising chloroacetic acid, and an aqueous base fluid comprising a KCl brine. The presence of the chloroacetic acid OAA may lead to a precipitate forming tendency of the HPT-1 relative permeability modifier of from about A to about B.

In still yet another embodiment, a WSF comprises a pre-reacted HMRPM/OAA comprising a polymer that has been prepared by pre-reacting a concentrated solution of HMRPM characterized by Structure I with sodium chloroacetate OAA at a temperature ranging from about 150° F. to about 200° F., and an aqueous base fluid comprising a KCl brine. The use of the sodium chloroacetate OAA may lead to a precipitate forming tendency of the pre-reacted HMRPM/OAA polymer of from about A to about B.

In still yet another embodiment, a WSF comprises a pre-reacted HMRPM/OAA comprising a polymer that has been prepared by pre-reacting a concentrated solution of HMRPM characterized by Structure I with chloroacetic acid OAA at a temperature ranging from about 150° F. to about 200° F., and an aqueous base fluid comprising a KCl brine. The use of the chloroacetic acid OAA may lead to a precipitate forming tendency of the pre-reacted HMRPM/OAA polymer of from about A to about B.

In still yet another embodiment, a WSF comprises a pre-reacted HMRPM/OAA comprising a polymer that has been prepared by pre-reacting a concentrated solution of HMRPM characterized by Structure I with chloroacetic anhydride OAA at a temperature ranging from about 150° F. to about 200° F., and an aqueous base fluid comprising a KCl brine. The use of the chloroacetic anhydride OAA may lead to a precipitate forming tendency of the pre-reacted HMRPM/OAA polymer of from about A to about B.

In still yet another embodiment, a WSF comprises a pre-reacted HMRPM/OAA comprising a polymer that has been prepared by pre-reacting a concentrated solution of HMRPM characterized by Structure I with chlorine end-capped polyethylene glycol product D-4253M OAA at a temperature ranging from about 150° F. to about 200° F., and an aqueous base fluid comprising a KCl brine. The use of chlorine end-capped polyethylene glycol product D-4253M OAA may lead to a precipitate forming tendency of the pre-reacted HMRPM/OAA polymer of from about A to about B.

In still yet another embodiment, a WSF comprises a pre-reacted HMRPM/OAA comprising a polymer that has been prepared by pre-reacting a concentrated solution of HMRPM characterized by Structure I with methyl chloroacetate OAA at a temperature ranging from about 150° F. to about 200° F., and an aqueous base fluid comprising a KCl brine. The use of the methyl chloroacetate OAA may lead to a precipitate forming tendency of the pre-reacted HMRPM/OAA polymer of from about A to about B.

In an embodiment, the WSF composition comprising a HMRPM/OAA combination may be prepared using any suitable method or process. The components of the WSF (e.g., HMRPM, OAA, aqueous base fluid, salt, etc.) may be combined and mixed in by using any mixing device compatible with the composition, e.g., a mixer, a blender, etc. In an embodiment, a pre-reacted HMRPM/OAA is prepared separately and diluted to a desired concentration with an aqueous base fluid of the type used in the subsequent formation of the WSF.

A HMRPM/OAA combination of the type disclosed herein may be included in any suitable wellbore servicing fluid (WSF). As used herein, a "servicing fluid" or "treatment fluid" refers generally to any fluid that may be used in a subterranean application in conjunction with a desired function and/or for a desired purpose, including but not limited to fluids used to drill, complete, work over, fracture, repair, or in any way prepare a wellbore for the recovery of materials residing in a subterranean formation penetrated by the wellbore. Examples of wellbore servicing fluids include, but are not limited to, cement slurries, drilling fluids or muds, spacer fluids, lost circulation fluids, fracturing fluids, gravel packing fluids, diverting fluids, or completion fluids. The servicing fluid is for use in a wellbore that penetrates a subterranean formation. It is to be understood that "subterranean formation" encompasses both areas below exposed earth and areas below earth covered by water such as ocean or fresh water.

In an embodiment, the HMRPM and the OAA may be added to the same WSF and delivered into the wellbore as a single stream WSF. In an embodiment, the HMRPM, the OAA and the pre-reacted HMRPM/OAA are manufactured off-site. In an alternative embodiment, the pre-reacted HMRPM/OAA is prepared at the well site. For example, the HMRPM and OAA can be contacted with each other at the well site prior to being introduced into the wellbore and/or subterranean formation. When manufactured or assembled off-site, the HMRPM, OAA and/or pre-reacted HMRPM/OAA may be transported to the well site and combined with the other components to form a WSF.

In an embodiment, the HMRPM and the OAA may be first pre-reacted with each other to form a pre-reacted HMRPM/OAA, and then the pre-reacted HMRPM/OAA may be added to the WSF composition. In an embodiment, the HMRPM and the OAA may be pre-reacted with each other off-site. In an alternative embodiment, the HMRPM and the OAA may be pre-reacted with each other at the well site. When manufactured or assembled off site, the pre-reacted HMRPM/OAA combination may be transported to the well site and combined with the other components to form a WSF.

When it is desirable to prepare a WSF of the type disclosed herein for use in a wellbore, a base (e.g., an aqueous base fluid) servicing fluid prepared at the well site or previously transported to and, if necessary, stored at the on-site location may be combined with the HMRPM, OAA, and/or the pre-reacted HMRPM/OAA, additional water and optional other additives to form the WSF. In an embodiment, additional relative permeability modifiers (e.g., conventional relative permeability modifiers) may be added to the WSF on-the-fly along with the other components/additives. The resulting WSF may be pumped downhole where it may function as intended (e.g., modify the relative permeability of at least a portion of the subterranean formation). WSFs of the type disclosed herein may be used in a variety of wellbore servicing operations, such as for example fracturing operations, gravel packing operations, enhanced oil recovery (EOR) operations, diversion operations, etc.

In an embodiment, the WSF is an aqueous based fracturing fluid with a pH of equal to or greater than about 2 comprising a HMRPM/OAA combination (e.g., a pre-reacted HMRPM/OAA), proppant, surfactants, and an aqueous fluid. In another embodiment, the WSF is an aqueous based gravel packing fluid with a pH of equal to or greater than about 2 comprising a HMRPM/OAA combination (e.g., a pre-reacted HMRPM/OAA), gravel, surfactants, and an aqueous fluid.

In an embodiment, the wellbore service being performed is a fracturing operation, wherein a WSF is placed (e.g., pumped downhole) in the formation. In such embodiment, the WSF is a fracturing fluid with a pH of equal to or greater than about 2. As will be understood by one of ordinary skill in the art, the particular composition of a fracturing fluid will be dependent on the type of formation that is to be fractured. Fracturing fluids in addition to a HMRPM/OAA combination typically comprise an aqueous fluid (e.g., water), a proppant, a surfactant, acid, friction reducers, gelling agents, scale inhibitors, pH-adjusting agents, oxygen scavengers, breakers, crosslinkers, iron-control agents, corrosion inhibitors, bactericides, and the like.

In an embodiment, the fracturing fluid comprises a proppant. In an embodiment, the proppant may comprise any suitable particulate material, which may be used to prop fractures open, i.e., a propping agent or a proppant. As used herein, a proppant refers to a particulate material that is suitable for use in a proppant pack or a gravel pack. When deposited in a fracture, the proppant may form a proppant pack, resulting in conductive channels through which fluids may flow to the wellbore. The proppant functions to prevent the fractures from closing due to overburden pressures.

Nonlimiting examples of proppants suitable for use in this disclosure include silica (sand), graded sand, Ottawa sands, Brady sands, Colorado sands; resin-coated sands; gravels; synthetic organic particles, nylon pellets, high density plastics, teflons, rubbers, resins; ceramics, aluminosilicates; glass; sintered bauxite; quartz; aluminum pellets; ground or crushed shells of nuts, walnuts, pecans, almonds, ivory nuts, brazil nuts, and the like; ground or crushed seed shells (including fruit pits) of seeds of fruits, plums, peaches, cherries, apricots, and the like; ground or crushed seed shells of other plants (e.g., maize, corn cobs or corn kernels); crushed fruit pits or processed wood materials, materials derived from woods, oak, hickory, walnut, poplar, mahogany, and the like, including such woods that have been processed by grinding, chipping, or other form of particleization; or combinations thereof. In an embodiment, the proppant comprises sand.

The proppants may be of any suitable size and/or shape. In an embodiment, a proppant suitable for use in the present disclosure may have an average particle size in the range of from about 2 to about 400 mesh, alternatively from about 8 to about 100 mesh, or alternatively from about 10 to about 70 mesh, U.S. Sieve Series.

In an embodiment, a proppant may be present in the WSF in an amount of from about 0.1 pounds per gallon (ppg) to about 28 ppg, alternatively from about 0.1 ppg to about 14 ppg, or alternatively from about 0.1 ppg to about 8 ppg, based on the volume of the fracturing or gravel-packing fluid.

In an embodiment, the wellbore service being performed is a gravel packing operation, wherein a WSF is placed (e.g., pumped downhole) in the formation. In such embodiment, the WSF is a gravel packing fluid. A "gravel pack" is a term commonly used to refer to a volume of particulate materials (such as gravel and/or sand) placed into a well bore to at least partially reduce the migration of unconsolidated formation particulates into the well bore. Gravel packing operations commonly involve placing a gravel pack screen in the wellbore neighboring a desired portion of the subterranean formation, and packing the surrounding annulus between the screen and the subterranean formation with particulate materials that are sized to prevent and inhibit the passage of formation solids through the gravel pack with produced fluids. In some instances, a screenless gravel packing operation may be performed. In an embodiment, the gravel pack comprises a proppant material of the type previously described herein. Gravel packing is described in more detail in U.S. Pat. No. 8,183,186, which is incorporated by reference herein in its entirety.

In an embodiment, a HMRPM/OAA combination (e.g., a pre-reacted HMRPM/OAA) and methods of using the same disclosed herein may be advantageously employed in the performance of one or more wellbore servicing operations. In an embodiment, the WSF comprising a HMRPM/OAA combination (e.g., a pre-reacted HMRPM/OAA) advantageously have a higher LCST than a similar WSFs employing only HMRPM, which may be especially advantageous when the pH of the WSF is equal to or greater than about 7. Further, the WSF comprising a HMRPM/OAA combination may advantageously have a lower precipitate forming tendency than similar WSFs employing only HMRPM lacking the OAA modification. When the OAA quaternizes an amine group of the HMRPM, thereby increasing the LCST as previously described herein, such quaternization may advantageously not interfere with the hydrophobic modification of the HMRPM, as shown in FIG. 1, where the hydrophobic modification is depicted by $(CH_2)_xCH_3$. Some conventional methodologies may use large amounts of surfactant for increasing the solubility of the RPM (e.g., raising the LCST of the WSF comprising the HMRPM), however, the disadvantage of having a lot of surfactant around is that the surfactant might interfere with and counteract the hydrophobic associative interactions of the hydrophobic modification.

In an embodiment, the WSF comprising a HMRPM/OAA combination (e.g., a pre-reacted HMRPM/OAA) may be advantageously used for modifying the permeability of at least a portion of any suitable type of subterranean formation. Nonlimiting examples of formations suitable for this disclosure include sandstone, carbonate-containing formations, shale, mudstone, limestone, chalk, or combinations thereof.

In an embodiment, the HMRPM/OAA combination (e.g., a pre-reacted HMRPM/OAA) may be advantageously used at bottom hole temperatures (BHTs) in the range of from about 140° F. to about 350° F., alternatively from about 175° F. to about 350° F., or from about 200° F. to about 300° F.

In an embodiment, the OAAs of the type described herein have the advantages of being highly water-soluble and readily commercially available.

In an embodiment, the HMRPM/OAA combination of the type described herein may be advantageously used in a variety of applications, such as for example produced water control, diversion of aqueous fluids, fluid loss control, profile control in injection well for EOR applications, water swelling inhibition of clays and shale, etc. Additional advantages of the WSF system and/or the methods of using the same may be apparent to one of skill in the art viewing this disclosure.

EXAMPLES

The embodiments having been generally described, the following examples are given as particular embodiments of the disclosure and to demonstrate the practice and advantages thereof. It is understood that the examples are given by way of illustration and are not intended to limit the specification or the claims in any manner.

Example 1

The properties of a HMRPM comprising HPT-1 (available from Halliburton Energy Services, Inc., Houston, Tex.) relative permeability modifier were investigated. More specifically the precipitate forming tendency of the HPT-1 relative permeability modifier was observed in the presence and in the absence of an OAA. In a control test, in diluted (0.2 wt. % polymer concentration) solutions of HPT-1 relative permeability modifier, the polymer (HPT-1 relative permeability modifier) precipitated out at 190° F. as a stringy solid in less than an hour (a precipitate forming tendency rating of F), if the pH of the solution was above 7. The tests were performed by placing 10 ml samples of the diluted HPT-1 relative permeability modifier solutions in a test tube placed inside a metal container, heating the samples at temperatures ranging from 225° F. to 250° F., and visually examining the solution for precipitation after one hour. The pH of the samples was in 8-9 range for all tested samples. The results from observing polymer precipitation are presented in Table 2 for various amounts of an OAA comprising MPEG-Cl added to a 0.2 wt. % HPT-1 relative permeability modifier solution; Table 3 for various amounts of an OAA comprising choloroacetic anhydride added to a 0.2 wt. % HPT-1 relative permeability modifier solution; and Table 4 for an OAA comprising sodium chloroacetate added to a 3 wt. % HPT-1 relative permeability modifier solution.

TABLE 2

| Sample No. | Amount of MPEG-Cl [ml] | Visual Observation After 1 h of Heating at 225° F. | Precipitate Forming Tendency |
|---|---|---|---|
| 1 | 0 | cloudy, clumps of polymer precipitated | F |
| 2 | 2 | slightly cloudy | B |
| 3 | 1 | slightly cloudy | B |
| 4 | 0.5 | cloudy, small clumps | D |
| 5 | 0.2 | clear | A |
| 6 | 0.1 | clear | A |
| 7 | 0.05 | slightly cloudy | B |
| 8 | 0.01 | cloudy, small clumps | D |
| 9 | 0.001 | cloudy | C |

TABLE 3

| Sample No. | Amount of Chloroacetic Anhydride [g] | Visual Observation After 1 h of Heating at 225° F. | Precipitate Forming Tendency |
|---|---|---|---|
| 10 | 0 | large clumps of polymer precipitated | F |
| 11 | 0.1 | clear | A |
| 12 | 0.05 | clear | A |

TABLE 4

| Sample No. | Amount of Sodium Chloroacetate [g] | Visual Observation After 1 h of Heating at 250° F. | Precipitate Forming Tendency |
|---|---|---|---|
| 13 | 0 | large clumps of polymer precipitated | F |
| 14 | 0.1 [Lot 1] | clear | A |
| 15 | 0.1 [Lot 2] | clear | A |
| 16 | 0.1 [Lot 3] | clear | A |

Samples 14, 15 and 16 from Table 4 are three replicates for the same amount of sodium chloroacetate used (0.1 g), showing that the inhibition of precipitate forming in the presence of an OAA is reproducible. The data in Tables 2, 3 and 4 indicate that the addition of OAA, specifically MPEG-Cl, chloroacetic anhydride and sodium chloroacetate, prevents the polymer precipitation while retaining the beneficial properties of the polymer, without the need to adjust the pH.

Example 2

Figure 2:
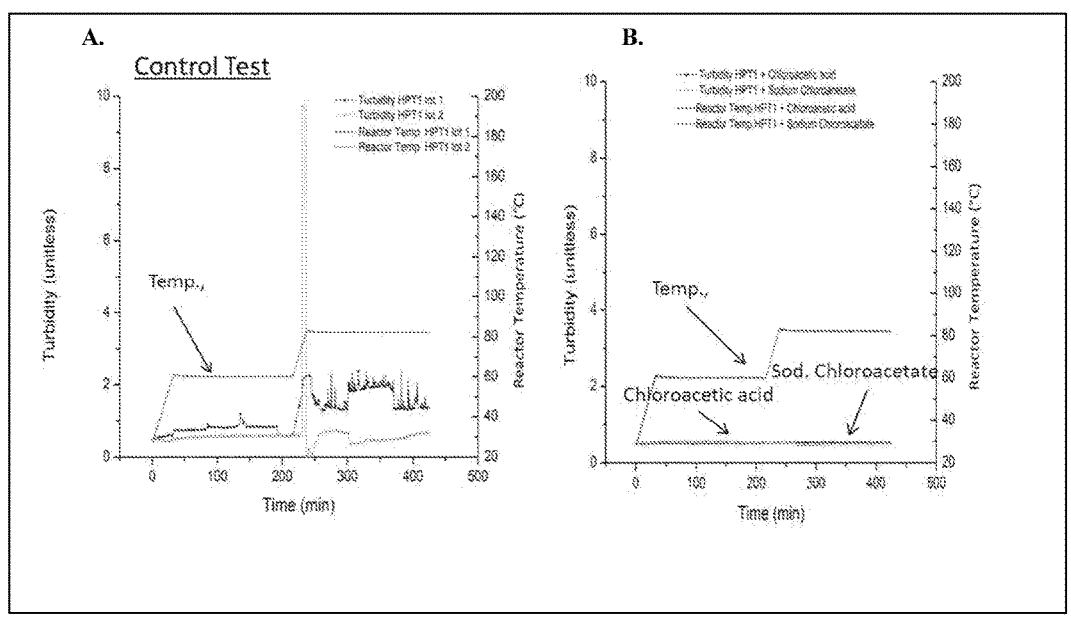
FIG. 2 displays turbidity measurements for relative permeability modifiers in the absence (2A) and in the presence (2B) of oxygenated alkylating agents.

The properties of a HMRPM comprising HPT-1 (available from Halliburton Energy Services, Inc.) relative permeability modifier were investigated. More specifically, the precipitating behavior of the HPT-1 relative permeability modifier was investigated by measuring the LCST as the temperature at which turbidity develops. The LCST was measured by using an automated turbidity measurement device that measures turbidity while a stirred sample is being heated. The device includes measurement cells and is commercially available from HEL Incorporated, Lawrenceville, N.J., USA under the trade name PolyBLOCK. Two of the cells were charged with control fluids containing only HPT-1 relative permeability modifier samples from two different lots at a dilution of 0.2 wt. % HPT-1 relative permeability modifier, by weight of the solution. Two other cells (i.e., a third cell and a fourth cell) contained same concentration of HPT-1 relative permeability modifier, i.e., 0.2 wt. % HPT-1 relative permeability modifier. Additionally, chloroacetic acid was added to the third cell, and sodium chloroacetate was added to the fourth cell in the same amounts by weight (i.e., 0.1 wt. % of chloroacetic acid or sodium chloroacetate per 10 ml of 0.2 wt. % HPT-1 relative permeability modifier polymer solution). The fluids in each of the cells were stirred, and the setup containing the cells was heated at a programmed rate, as shown in FIGS. 2A and 2B. The temperature profiles coincide for the two control cells in FIG. 2A, and for the third cell and fourth cell shown in FIG. 2B, respectively. The turbidy in each cell was measured during the experiment, and the turbidity data is also presented in FIG. 2A for the two control cells, and for the third cell and fourth cell in FIG. 2B. FIG. 2A (for the two control cells) indicates a sharp rise in turbidity at about 78° C. (172.4° F.) for both control samples. The turbidity of the solutions containing chloroacetic acid or sodium chloroacetate remained constant regardless of the temperature as shown in FIG. 2B, indicating that there was no precipitation because the LCST of the fluid was not exceeded even at 81° C. (178° F.). The results clearly indicate that an OAA comprising sodium chloroacetate or chloroacetic acid is effective in preventing precipitation of HPT-1 relative permeability modifier by raising the LCST of the HMRPM polymer (e.g., HPT-1 relative permeability modifier).

Example 3

The properties of a HMRPM comprising HPT-1 relative permeability modifier were investigated. More specifically, the water-permeability controlling ability of the HPT-1 relative permeability modifier polymer in the presence of an OAA comprising MPEG-Cl was investigated by fluid loss control tests. The fluid loss control tests were performed by measuring the flow rates of water or polymer solution through a silica flour filter cake prepared by deposition of 10 grams of silica flour mixed in water onto filter paper placed over the bottom lid in a Filter Press HPHT fluid loss cell with a capacity of 175 ml supplied by Fann Instruments, Houston, Tex., USA. The filter cake deposition was facilitated by application of pressure (30 psi). Water or polymer solution was then poured onto top of the filter cake, and flow rate was measured over a 10 minute period by applying a pressure of 30 psi. The polymer solutions used had a concentration of 67 gallons of polymer per thousand gallon solution (gpt), and they were made in 2 wt. % KCl in water. The polymer solutions also contained 1 vol. % of MPEG-Cl. Initially, flow rate of water was established prior to treatment of the filter cake with the polymer solution. A flow rate reduction of 50% or more is assumed to be indicative of desired potential for decreasing the permeability of a formation to water flow by the polymer and is given a "pass" rating. The results of the fluid loss control tests for a HMRPM comprising HPT-1 relative permeability modifier and an OAA comprising MPEG-Cl are displayed in Table 5.

TABLE 5

| Time [min] | Amount of Leak Off [ml] | Performance Rating [pass/fail] |
|---|---|---|
| Control - Water | | |
| 0.25 | 60 | control value |
| Sample Heated at 225° F. for 1 h | | |
| 10 | 30 | pass |
| Sample Not Heated | | |
| 10 | 7.6 | pass |

The data in Table 5 show that permeability of silica filter cake to water flow is significantly reduced by using the HPT-1 relative permeability modifier/MPEG-Cl combination. It is also important to note that the results indicate that the HMRPM/OAA combination can simply be blended and pumped instead of any additional heating step to ensure polymer modification. This may allow for on-the-fly contacting of the HMRPM and the OAA when the formation conditions (e.g., temperature) indicate that the HMRPM by itself may precipitate under downhole conditions.

Another set of fluid loss control tests were performed using calcium carbonate solid (50 micron average particle size) instead of silica flour. Chloroacetic acid was used as the OAA. The concentration of HPT-1 relative permeability modifier was 0.2 wt. %, by weight of the solution. The amount of chloroacetic acid added was 85 pounds per 1,000 gallons (lb/Mgal) of HPT-1 relative permeability modifier solution. For each sample, water leak off rates were compared for the HPT-1 relative permeability modifier solution as the HMRPM with the HMRPM/OAA combination. The results are shown in Table 6 and the data from Table 6 was plotted in FIG. 3.

TABLE 6

| Sample | Temperature [° F.] | Amount of Leak Off [ml] | Performance Rating [pass/fail] | Time to Hit 50 mL for Water Only |
|---|---|---|---|---|
| 67 gpt HPT-1 relative permeability modifier | 70 | 15 | pass | 11 s |
| 67 gpt HPT-1 relative permeability modifier | 170 | 100 | fail | 11 s |
| 67 gpt HPT-1 relative permeability modifier, pH 4.89 | 70 | 36.99 | pass | 11 s |
| 67 gpt HPT-1 relative permeability modifier, pH 4.89 | 170 | 100 | fail | 11 s |
| 67 gpt HPT-1 relative permeability modifier, 85 lb/Mgal Chloroacetic acid | 70 | 14.12 | pass | 10 s |
| 67 gpt HPT-1 relative permeability modifier, 85 lb/Mgal Chloroacetic acid | 170 | 10.47 | pass | 10 s |
| 67 gpt HPT-1 relative permeability modifier, 85 lb/Mgal Chloroacetic acid | 70 | 10 | pass | 18 s |
| 67 gpt HPT-1 relative permeability modifier, 85 lb/Mgal Chloroacetic acid | 170 | 4.36 | pass | 18 s |

Figure 3:
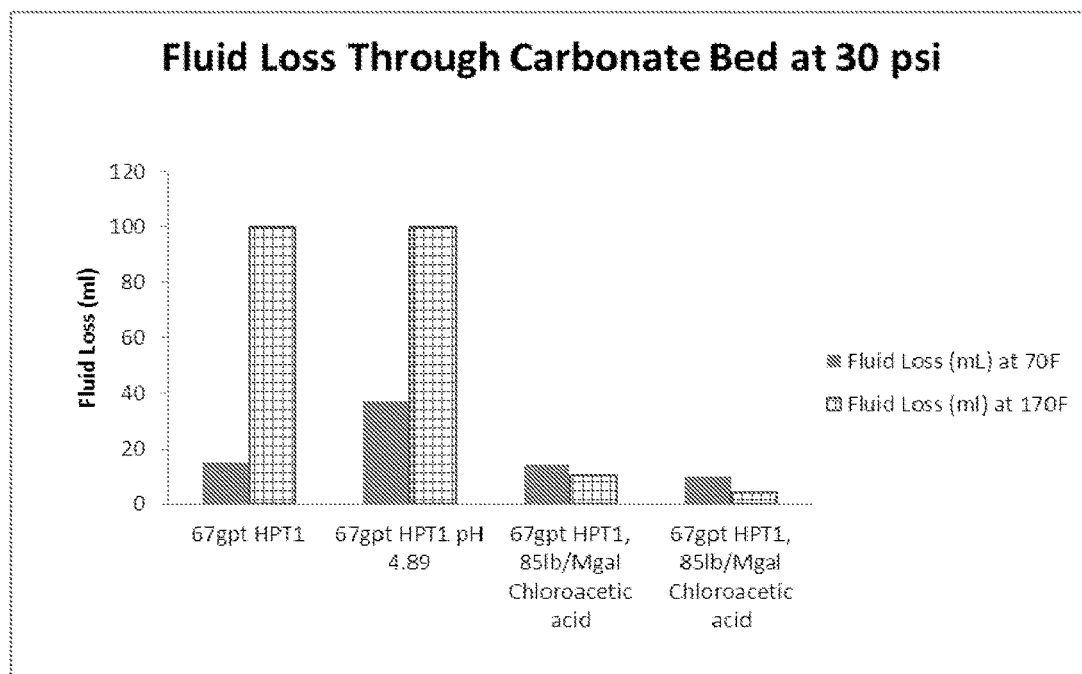
FIG. 3 displays results of fluid loss measurements for relative permeability modifiers in the absence and in the presence of oxygenated alkylating agents.

The results in Tables 5 and 6 and FIG. 3 show that HMRPM/OAA is effective in controlling fluid leak through silica or carbonate formations. The results in Table 6 and FIG. 3 show that fluid leak off control with HMRPM is significantly improved with OAA modification.

Example 4

Concentrated solutions of HPT-1 relative permeability modifier with a polymer concentration of 3 wt. % HPT-1 relative permeability modifier (e.g., polymer concentrate solutions), by weight of solution, were mixed with different amounts of sodium chloroacetate as the OAA, and heated to 175° F. for 1 hr. Two different concentrations of the OAA (e.g., sodium chloroacetate) were used: 1 vol. % and 0.1 vol. %, by volume of HMRPM (e.g., HPT-1 relative permeability modifier) solution. The 1 vol. % OAA (e.g., sodium chloroacetate) solution became viscous when cooled to room temperature, but did not show any sign of precipitation at 175° F. The 0.1 vol. % solution of OAA was also free of any precipitation at 175° F., and remained fluid when cooled to room temperature. The results indicate that HMRPM can be pre-reacted with OAA prior to use, and can be added to any suitable WSF in desired concentrations.

It was typically observed that when 3 wt. % polymer (e.g., HPT-1 relative permeability modifier) solutions (e.g., polymer concentrate solutions) were used, the reaction products subsequent to heating became viscous gels, whereas diluted solutions (for example, 0.2 wt. % polymer concentration) remained thin after the reaction. This observation suggests that the addition of OAA for preventing high temperature precipitation may be best applied at the well site, instead of having the supplier supply a pre-reacted polymer concentrate solution with a concentration of 3 wt. % that might be too viscous.

Additional Disclosure

A first embodiment, which is a method of servicing a wellbore in a subterranean formation comprising placing a wellbore servicing fluid in the wellbore and/or subterranean formation, wherein the wellbore servicing fluid comprises a hydrophobically modified relative permeability modifier, an oxygenated alkylating agent, and an aqueous base fluid, and allowing the wellbore servicing fluid to modify the permeability of at least a portion of the wellbore and/or subterranean formation.

A second embodiment, which is the method of the first embodiment wherein the hydrophobically modified relative permeability modifier comprises a water-soluble, hydrophobically modified polymer.

A third embodiment, which is the method of the second embodiment wherein the water-soluble, hydrophobically modified polymer comprises hydrophobically modified poly(dimethylaminoethyl methacrylate), hydrophobically modified poly(dimethylaminopropyl methacrylamide), poly(alkyldimethylammoniumethyl methacrylate), poly(octadecyldimethylammoniumethyl methacrylate), poly(hexadecyldimethylammoniumethyl methacrylate), poly(octadecyldimethylammoniumethyl methacrylamide), poly(hexadecyldimethylammoniumpropyl methacrylamide), acrylamide/octadecyldimethylammoniumethyl methacrylate bromide copolymer, dimethylaminoethyl methacrylate/vinyl pyrrolidone/hexadecyldimethylammoniumethyl methacrylate bromide terpolymer, acrylamide/2-acrylamido-2-methyl propane sulfonic acid/2-ethylhexyl methacrylate terpolymer, amino methacrylate/alkyl amino methacrylate copolymer, dimethylaminoethyl methacrylate/alkyl-dimethylammoniumethyl methacrylate copolymer, dimethylaminoethyl methacrylate/hexadecyldimethylammoniumethyl methacrylate copolymer, dimethylaminoethyl methacrylate/hexadecyldimethylammoniumethyl methacrylate bromide copolymer, dimethylammoniumethyl methacrylate/cetyldimethylammoniumethyl methacrylate copolymer, dimethylaminoethyl acrylate/acrylate/alkyldimethylammoniumethyl acrylate copolymer, a compound characterized by Structure I:

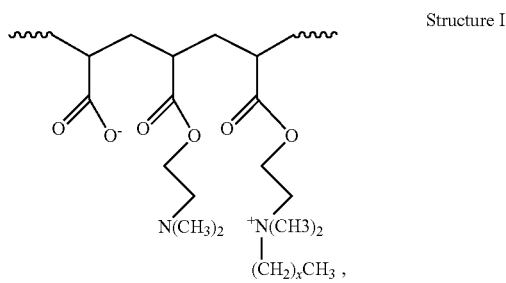

or combinations thereof.

A fourth embodiment, which is the method of one of the first through third embodiments wherein the hydrophobically modified relative permeability modifier comprises a polyelectrolyte.

A fifth embodiment, which is the method of one of the first through fourth embodiments wherein the hydrophobically modified relative permeability modifier is present in the wellbore servicing fluid in an amount of from about 0.01 wt. % to about 10 wt. %, based on the total weight of the wellbore servicing fluid.

A sixth embodiment, which is the method of one of the first through fifth embodiments wherein the oxygenated alkylating agent comprises a compound characterized by the general formula R—X, where X is a leaving group and R comprises at least one oxygen atom for every from about 1 to about 5 carbons, with a carbon-to-oxygen ratio of from about 5:1 to about 1:1.

A seventh embodiment, which is the method of the sixth embodiment wherein the leaving group comprises include halide, chloride, bromide, iodide, sulfonate, sufonate esters, toluenesulfonate (i.e., tosylate), methanesulfonate (i.e., mesylate), carboxylate group, or combinations thereof An eighth embodiment, which is the method of one of the first through seventh embodiments wherein the oxygenated alkylating agent comprises alcohols; polyethylene oxides; polyethylene glycols, chlorine end-capped methylpolyethylene glycol (MPEG-Cl); polypropylene glycols; amines; epoxides; oxygenated alkyl halides; oxygenated alkyl sulfonates; oxygenated alkyl sulfates; halogenated organic acids, chloroacetic acid; chloroacetate esters, methyl chloroacetate; chloroacetate salts, sodium chloroacetate; carboxylic acid anhydrides, chloroacetic anhydride; esters; imides; amides; acid halides; derivatives thereof; or combinations thereof.

A ninth embodiment, which is the method of one of the first through eighth embodiments wherein the oxygenated alkylating agent is present in the wellbore servicing fluid in an amount of from about 0.001 wt. % to about 1 wt. %, based on the total weight of the wellbore servicing fluid.

A tenth embodiment, which is the method of one of the first through ninth embodiments wherein the aqueous base fluid comprises a brine.

An eleventh embodiment, which is the method of the tenth embodiment wherein the brine is present in the wellbore servicing fluid in an amount of from about 40 wt. % to about 99.8 wt. %, based on the total weight of the wellbore servicing fluid.

A twelfth embodiment, which is the method of one of the first through eleventh embodiments wherein the wellbore servicing fluid has a pH of equal to or greater than about 2.

A thirteenth embodiment, which is the method of the twelfth embodiment wherein the wellbore servicing fluid comprises an oxygenated alkylating agent and a hydrophobically modified relative permeability modifier that has a lower critical solution temperature of equal to or greater than about 140° F.

A fourteenth embodiment, which is the method of one of the twelfth through thirteenth embodiments wherein the wellbore servicing fluid is a fracturing fluid.

A fifteenth embodiment, which is the method of one of the twelfth through thirteenth embodiments wherein the wellbore servicing fluid is a gravel packing fluid.

A sixteenth embodiment, which is a method of servicing a wellbore in a subterranean formation comprising placing a wellbore servicing fluid in the wellbore and/or subterranean formation, wherein the wellbore servicing fluid comprises a hydrophobically modified relative permeability modifier, an oxygenated alkylating agent, and an aqueous base fluid; wherein the hydrophobically modified relative permeability modifier comprises poly(alkyldimethylammoniumethyl methacrylate), the oxygenated alkylating agent comprises chlorine end-capped methylpolyethylene glycol, and the aqueous base fluid comprises a brine, and allowing the wellbore servicing fluid to modify the permeability of at least a portion of the wellbore and/or subterranean formation.

A seventeenth embodiment, which is the method of the sixteenth embodiment wherein the wellbore servicing fluid has a pH of equal to or greater than about 2.

An eighteenth embodiment, which is the method of the seventeenth embodiment wherein the wellbore servicing fluid is a fracturing fluid further comprising a proppant.

A nineteenth embodiment, which is the method of one of the seventeenth through eighteenth embodiments wherein the wellbore servicing fluid comprises an oxygenated alkylating agent and a hydrophobically modified relative permeability modifier that has a lower critical solution temperature of equal to or greater than about 140° F.

A twentieth embodiment, which is a method of servicing a wellbore in a subterranean formation comprising placing a wellbore servicing fluid in the wellbore and/or subterranean formation, wherein the wellbore servicing fluid comprises a pre-reacted hydrophobically modified relative permeability modifier/oxygenated alkylating agent, and an aqueous base fluid, and allowing the wellbore servicing fluid to modify the permeability of at least a portion of the wellbore and/or subterranean formation.

A twenty-first embodiment, which is the method of the twentieth embodiment wherein the wellbore servicing fluid comprises a pre-reacted hydrophobically modified relative permeability modifier/oxygenated alkylating agent that has a lower critical solution temperature of equal to or greater than about 150° F.

A twenty-second embodiment, which is an aqueous based wellbore servicing fluid with a pH of equal to or greater than about 2 comprising a hydrophobically modified relative permeability modifier, wherein the hydrophobically modified relative permeability modifier comprises a water-soluble, hydrophobically modified polymer and an oxygenated alkylating agent, wherein the oxygenated alkylating agent comprises a compound characterized by the general formula R—X, where X is a leaving group and R comprises at least one oxygen atom for every from about 1 to about 5 carbons, with a carbon-to-oxygen ratio of from about 5:1 to about 1:1.

A twenty-third embodiment, which is the wellbore servicing fluid of the twenty-second embodiment wherein the hydrophobically modified relative permeability modifier and the oxygenated alkylating agent are pre-reacted prior to formation of the wellbore servicing fluid.

A twenty-fourth embodiment, which the wellbore servicing fluid of the twenty-third embodiment wherein the pre-reacted hydrophobically modified relative permeability modifier/oxygenated alkylating agent has a lower critical solution temperature of equal to or greater than about 150° F.

A twenty-fifth embodiment, which is the wellbore servicing fluid of one of the twenty-second through twenty-fourth embodiments formulated as a fracturing fluid or a gravel pack fluid.

While embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of servicing a wellbore in a subterranean formation comprising:
placing a wellbore servicing fluid in the wellbore and/or subterranean formation, wherein the wellbore servicing fluid comprises:
an aqueous base fluid,
a hydrophobically modified relative permeability modifier, and
an oxygenated alkylating agent comprising a compound selected from the group consisting of: a polyethylene oxide, a polyethylene glycol, a polypropylene glycol, an amine, an epoxide, an oxygenated alkyl halide, an oxygenated alkyl sulfonate, an oxygenated alkyl sulfate, a halogenated organic acid, a chloroacetic acid, a chloroacetate ester, a methyl chloroacetate, a chloroacetate salt, a sodium chloroacetate, a carboxylic acid anhydride, a chloroacetic anhydride, an ester, an imide, an amide, an acid halide, derivatives thereof, or combinations thereof, wherein the compound is characterized by the formula R—X where X is a leaving group and R has a molar ratio of carbon-to-oxygen from 5:1 to 1:1; and
allowing the wellbore servicing fluid to modify the permeability of at least a portion of the wellbore and/or subterranean formation.

2. The method of claim 1 wherein the hydrophobically modified relative permeability modifier comprises a water-soluble, hydrophobically modified polymer.

3. The method of claim 2 wherein the water-soluble, hydrophobically modified polymer comprises hydrophobically modified poly(dimethylaminoethyl methacrylate), hydrophobically modified poly(dimethylaminopropyl methacrylamide), poly(alkyldimethylammoniumethyl methacrylate), poly(octadecyldimethylammoniumethyl methacrylate), poly(hexadecyldimethylammoniumethyl methacrylate), poly(octadecyldimethylammoniumethyl methacrylamide), poly(hexadecyldimethylammoniumpropyl methacrylamide), acrylamide/octadecyldimethylammoniumethyl methacrylate bromide copolymer, dimethylaminoethyl methacrylate/vinyl pyrrolidone/hexadecyldimethylammoniumethyl methacrylate bromide terpolymer, acrylamide/2-acrylamido-2-methyl propane sulfonic acid/2-ethylhexyl methacrylate terpolymer, amino methacrylate/alkyl amino methacrylate copolymer, dimethylaminoethyl methacrylate/alkyldimethylammoniumethyl methacrylate copolymer, dimethylaminoethyl methacrylate/hexadecyldimethylammoniumethyl methacrylate copolymer, dimethylaminoethyl methacrylate/hexadecyldimethylammoniumethyl methacrylate bromide copolymer, dimethylammoniumethyl methacrylate/cetyldimethylammoniumethyl methacrylate copolymer, dimethylaminoethyl acrylate/acrylate/alkyldimethylammoniumethyl acrylate copolymer, a compound characterized by Structure I:

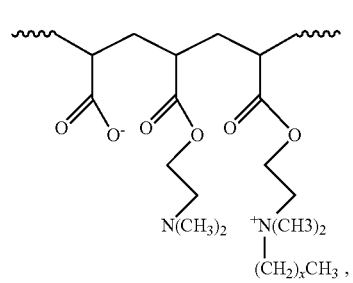

or combinations thereof.

4. The method of claim 1 wherein the hydrophobically modified relative permeability modifier comprises a polyelectrolyte.

5. The method of claim 1 wherein the hydrophobically modified relative permeability modifier is present in the wellbore servicing fluid in an amount of from about 0.01 wt. % to about 10 wt. %; the oxygenated alkylating agent is present in the well bore servicing fluid in an amount of from about 0.001 wt. % to about 1 wt. %; and the aqueous base fluid is present in the wellbore servicing fluid in an amount of from about 40 wt. % to about 99.8 wt. %, based on the total weight of the well bore servicing fluid.

6. The method of claim 1 wherein R has a molar ratio of carbon-to-oxygen from 3:1 to 2:1.

7. The method of claim 1 wherein the leaving group comprises a compound selected from the group consisting of: a halide, a chloride, a bromide, an iodide, a sulfonate, a sufonate ester, a toluenesulfonate, a methanesulfonate, a carboxylate group, or combinations thereof.

8. The method of claim 1 wherein the aqueous base fluid comprises a brine.

9. The method of claim 1 wherein the wellbore servicing fluid has a pH of equal to or greater than about 2.

10. The method of claim 1 wherein the wellbore servicing fluid comprises an oxygenated alkylating agent and a hydrophobically modified relative permeability modifier that has a lower critical solution temperature of equal to or greater than about 140° F.

11. The method of claim 1 wherein the wellbore servicing fluid is a fracturing fluid or a gravel packing fluid.

12. The method of claim 1 wherein the hydrophobically modified relative permeability modifier and the oxygenated alkylating agent are pre-reacted prior to formation of the wellbore servicing fluid.

13. The method of claim 12 wherein the pre-reacted hydrophobically modified relative permeability modifier/oxygenated alkylating agent that has a lower critical solution temperature of equal to or greater than about 150° F.

* * * * *